May 18, 1954
E. BESAG ET AL
2,678,981
OVERLOAD BOX HOUSING THE THERMAL OVERLOAD
DEVICE FOR MOTOR STARTING SWITCHES
Filed Nov. 15, 1951
3 Sheets-Sheet 1
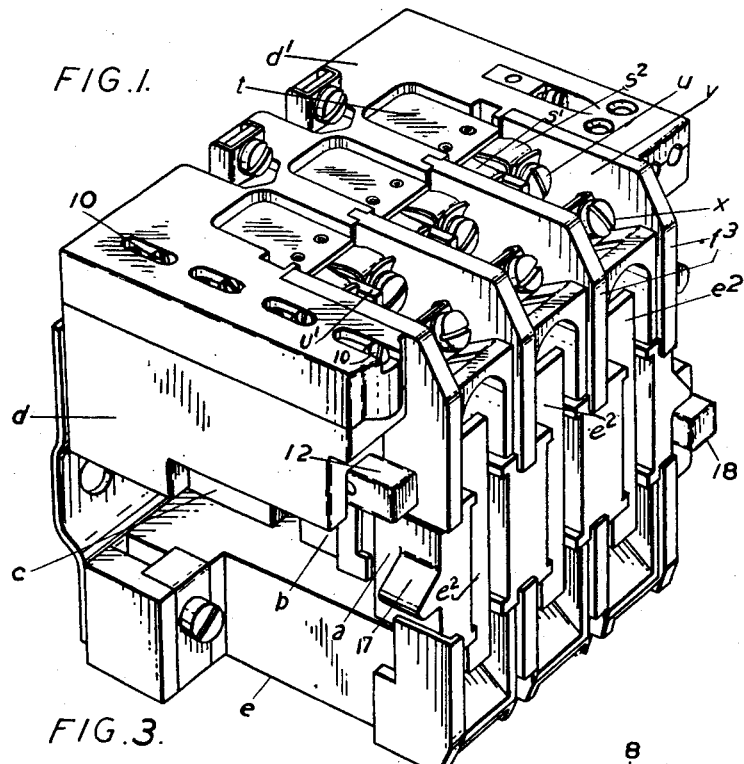
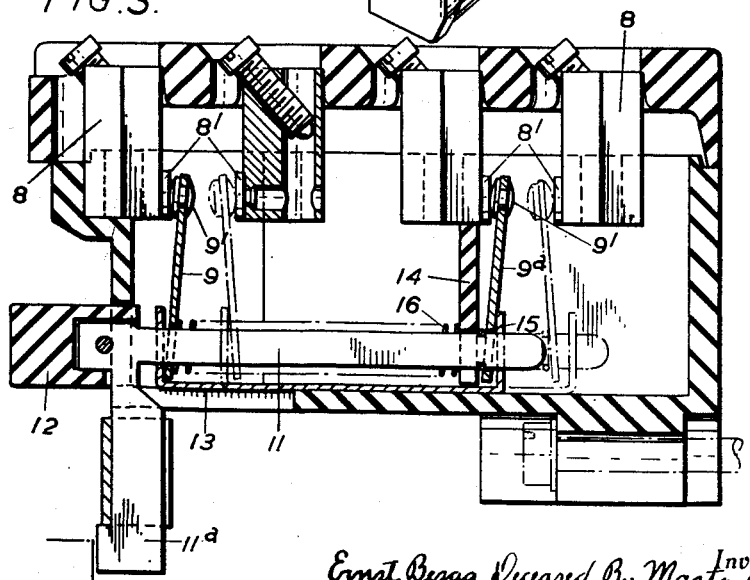
Inventors:—
Ernst Besag, Deceased, By Marta Besag,
His Executrix, and Thomas D. G. Wintle,
By Smith, Michael and Gardiner,
Attorneys

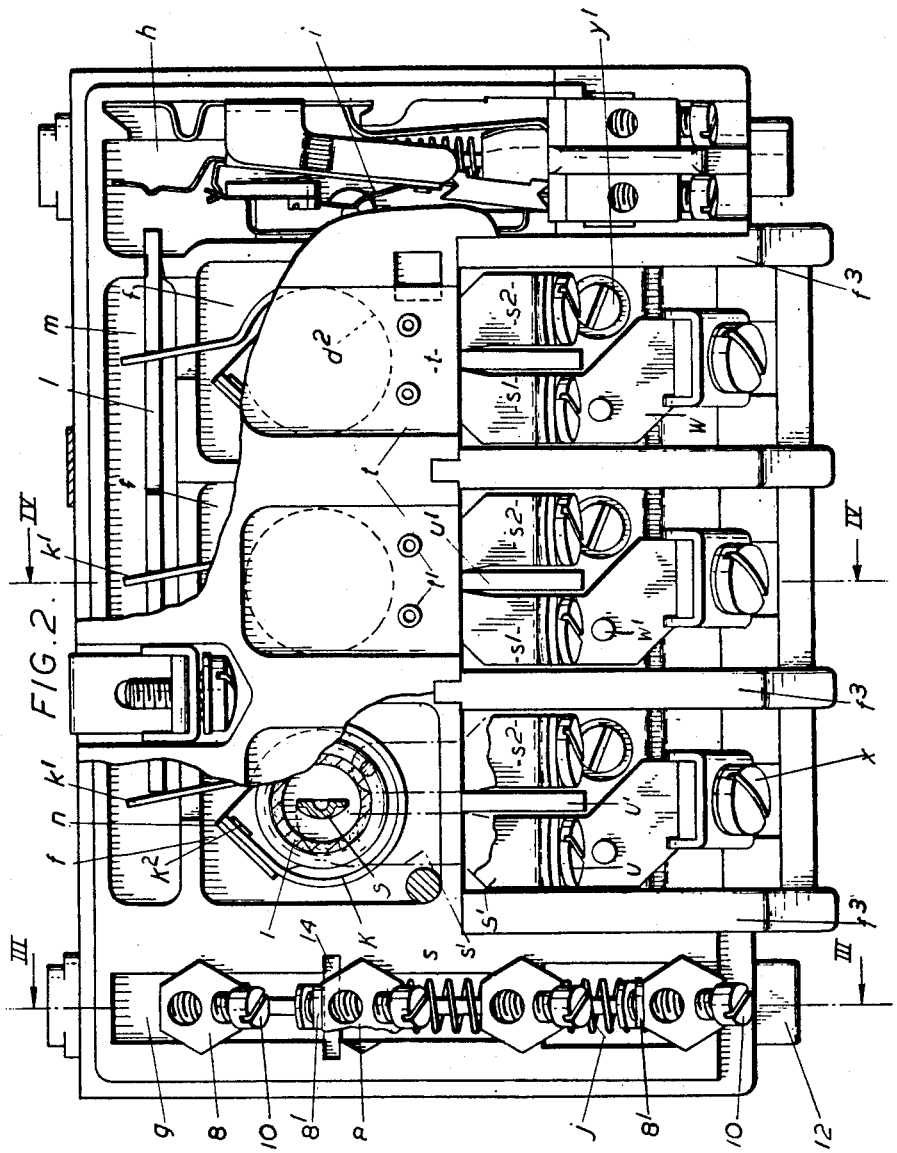

May 18, 1954
E. BESAG ET AL
2,678,981
OVERLOAD BOX HOUSING THE THERMAL OVERLOAD
DEVICE FOR MOTOR STARTING SWITCHES
Filed Nov. 15, 1951
3 Sheets-Sheet 3
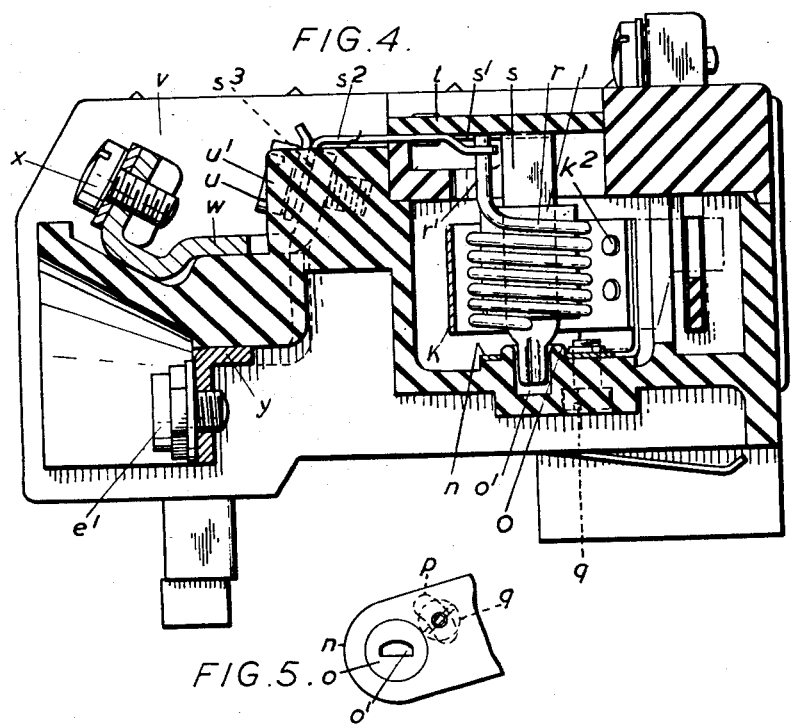
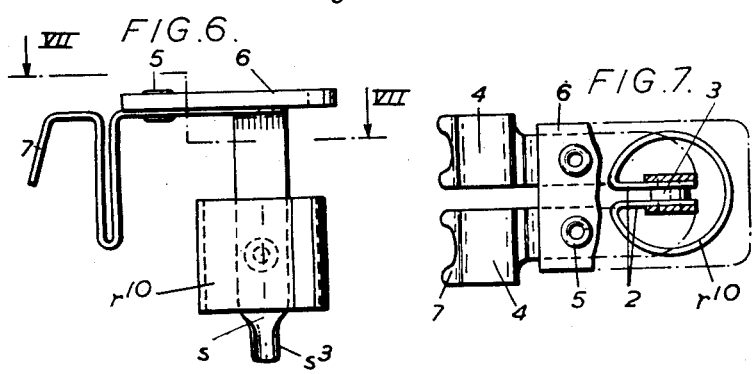
Inventors:-
Ernst Besag, Deceased, By Marta Besag,
His Executrix, and Thomas D.G. Wintle,
By Smith, Michael and Gardiner,
Attorneys.

Patented May 18, 1954

2,678,981

UNITED STATES PATENT OFFICE 2,678,981

OVERLOAD BOX HOUSING THE THERMAL OVERLOAD DEVICE FOR MOTOR STARTING SWITCHES

Ernst Besag, deceased, late of Streetly, England, by Marta Besag, executrix, Streetly, and Thomas D. G. Wintle, Birmingham, England, assignors to J. A. Crabtree & Co. Limited, Walsall, England, a British company Application November 15, 1951, Serial No. 256,488

Claims priority, application Great Britain November 17, 1950

7 Claims. (Cl. 200—116)

This invention relates to overload boxes housing the thermal overload devices for polyphase contactor or starting switches for electric motors, and is particularly concerned with arrangements in which such boxes are associated with "start" contacts and with trip mechanism operated by the thermal devices in the event of overload.

The object of the present invention is to provide an economical construction adapted for facilitating the change and replacement of the heater coils of the thermal devices, and the adjustment of the bimetals in relation to the actuating bar of the trip mechanism.

According to this invention each overload device comprises a part-cylindrical bimetal enclosing a heater and formed with an outwardly extending leg for engaging a trip bar, the bimetal being carried by a bracket which is rotationally adjustable around the axis of the cylindrical part of the bimetal to enable the end of the leg to be adjusted in relation to the trip bar.

In order to effect adjustment, securing means, such as a screw or clip, may be loosened to enable the bracket and bimetal to be turned around a locating boss on the box. The screw is then tightened for securing the bracket and bimetal in the adjusted position. The bracket may be L-shaped, the vertical arm being secured to the bimetal, while the other arm is seated over the boss. The fixing screw extends through an arcuate slot in the box, into a tapped opening in the bracket. The slot is struck on an arc having the boss as its centre, so that the screw can move in the slot when the bracket and bimetal are adjusted. The head of the screw is tightened against the box for securing the parts in position.

The improved manner of adjustment is obtained without imposing undesirable stress on the cylindrical part of the bimetal while avoiding displacement of such part in relation to the heater. Each heater unit, comprises an insulating plate on which are mounted a heater element, a pair of parallel connector strips adapted for readily removable engagement with terminal screws on the box, and a central stem adapted for mounting in a recess in the locating boss. The boss thus acts not only for locating the bracket but also for positioning the stem, and thereby the heater coil, within the bimetal. The improved arrangement provides a readily replaceable unit without the provision of body parts produced from mouldings.

The start mechanism is mounted in a compartment of the box and comprises a row of four spaced terminal pillars, pairs of which are engaged with moving contact blades carried by a bar or rod on the start button and extending through a cradle which embraces the lower ends of the blades and between which is a helical spring encircling the rod or bar. The pillars may be of standard hexagonal section and they may be inserted through openings in the top of the compartment to enable them to be visible and tested for operation before the cover of the box is placed in position thereby facilitating inspection. The provision of a single spring, guided by its encirclement of the rod or bar of the push button, enables the correct alignment and pressure of each of the contacts. The spring, which is relatively long, ensures that the requisite pressure for holding the button in the "on" position by the armature is reduced to a minimum.

In order to enable the invention to be readily understood reference will now be made to the accompanying drawings illustrating a three-pole motor-starting switch embodying an overload box in accordance with the invention and in which drawings—

Figure 1 is a perspective view of the motor starting switch, the overload box being disposed in the upper portion thereof.

Figure 2 is a plan to an enlarged scale of Figure 1 with parts of the top cover removed.

Figure 3 is a section on the line III—III of Figure 2 of the upper part of the switch, with the start button parts in the "off" position.

Figure 4 is a section on the line IV—IV of Figure 2 of the upper parts of the switch.

Figure 5 is a detailed plan view of the rotational adjustment for the bimetal element.

Figure 6 is an elevation of an alternative construction of a removable heater unit.

Figure 7 is a part sectional view on the line VII—VII of Figure 6.

Referring to the drawings, the switch comprises an insulating moving contact carrier $a$ supporting an armature $b$ which is actuated by a magnet $c$ for causing the carrier to slide horizontally between upper and lower boxes $d$, $e$, provided with fixed contacts $e^1$ engageable with the moving contact $e^2$, as described and claimed in our United States Patent No. 2,565,467.

The upper box $d$ is an overload box, moulded from insulating material, and partitioned to form end compartments $g$, $h$, the compartment $h$ on the right housing a trip mechanism $i$ and stop button 18 of the construction described and claimed in our United States patent application Serial No. 173,102, filed July 11, 1950, and that on the left receiving a start button mechanism $j$. At the rear is a narrow compartment $m$ in which is guidingly slidable a trip bar $l$. Between the end compartments $g$, $h$, the box is chambered to provide, towards its rear, three intermediate chambers $f$ in each of which is mounted a thermal overload device, while at the front the box is partitioned to receive main terminals $x$ in its upper part and the fixed contacts $e^1$ in its lower part. The terminals and contacts of respective poles are separated by arc shields $f^3$.

The thermal overload device, disposed in each intermediate chamber $f$, comprises a bimetal element having a part-cylindrical portion $k$ disposed on a vertical axis, and from one end of which there is a rearwardly extending leg $k^1$ for engaging the trip bar $l$, formed from a flat strip of insulating material and slidably guided in the narrow compartment $m$ at the rear of the box, and with one end projecting into the trip chamber $h$. Near its vertical edge at the other end thereof each bimetal element is secured by rivets $k^2$ to the vertical arm of an L-shaped bracket $n$, the horizontal arm of which is centrally apertured and passed over a locating boss $o$ concentric with the part-cylindrical portion $k$ upstanding from the floor of the box $d$ which is formed with an arcuate slot $p$, see Figure 5, through which extends a securing screw $q$ for the bracket. When it is desired to adjust the end $k$ of a bimetal in relation to the trip bar $l$, the securing screw $q$ is loosened and the bracket is rotationally adjusted around the locating boss $o$, whereupon the screw $q$, which enters a tapped hole in the bracket $n$, is tightened for securing the bimetal in position of adjustment.

Each heater member comprises a coil $r$ (Figures 2 and 4), or a cylindrical strip $r^{10}$ (Figures 6 and 7) mounted on, and suspended from (together with a pair of parallel conductive connector strips $s^1 s^2$), a flat insulating plate $t$ so as to be removable as a unit. The lower end of the coil $r$ (Figures 2 and 4) is inserted into a hole in a vertical stem $s$ and is brazed thereto. The stem, which is disposed substantially centrally within the bimetal, has its upper end bent forwardly to constitute one connector strip $s^1$. The upper end of the coil is formed with an upward extension $r^1$ which passes through a hole in, and is brazed to, the other connector strip $s^2$. These strips $s^1$ and $s^2$ are riveted at $t^1$ to the plate $t$ extending over the heater and the bimetal, their forward ends being downturned and bifurcated at $s^3$ to enable them to be secured by the terminal screws $u$. These bifurcations are formed in the sloped ends of the connectors and enable the removal of the heater units by merely loosening the terminal screws $u$, which are separated from each other by insulating barriers $u^1$ on the box.

The stem $s$ of each heater unit may be formed with a longitudinal strengthening corrugation or groove $s^5$ and its lower reduced end is non-rotatably received in a recess $o^1$ in the locating boss $o$. Asbestos washers and a tube $l$ may be disposed along the length of the stem for positioning it away from the heater coil $r$ and maintaining it in correct relation with the part-cylindrical bimetal $k$. One of the terminals $u$ of each pair is connected by a conductive strap $w$ to a main terminal $x$, while the other is connected by a depending strip $y$ to a main fixed contact $e^1$. The strap $y$ is secured in position to the underside of the box by screws $y^1$ inserted from the top of the box while the straps $w$ are secured in position by screws $w^1$ introduced from the bottom of the box. The top of the box $d$ is closed by a moulded insulating cover $d^1$ formed with circular openings $d^2$ to permit the introduction and removal of the heater units into position within the bimetals. Each opening is closed by the insulating plate $t$ which seats in a correspondingly formed recess around the opening.

For small currents, the heating coil $r$ is composed of fine wire, may be wound on a tubular ceramic former and fixed thereto by vitreous enamel, the ceramic former being located on the stem $s$, in the same manner as the asbestos washers and tube $l$. For the higher current ratings the heater is preferably in the form of conductive strip $r^{10}$ as seen in Figures 6 and 7, the strip having its vertical edges 2 bent inwards and disposed diametrically and parallel to each other with refractory spacing buttons 3 disposed between these parts to which the connector strips 4, 4, are brazed. These connector strips are secured by rivets 5 to a flat insulating plate 6, as described with reference to Figures 2 and 4, and their forward downturned ends 7 are bifurcated for engagement with the terminals as previously described. The stem $s$ is of the construction shown in Figure 4.

The trip mechanism, with which is associated the stop button, and which may be of the construction described and claimed in our United States patent application Serial No. 173,102, filed July 11, 1950, is disposed in a compartment to the right of the thermal relays and the start button mechanism is mounted in a compartment at the left of the relays. This start button mechanism $j$ may comprise four vertically disposed hexagonal metal pillars 8 the laterally angled parts of which are non-rotatably received in triangular recesses or grooves in side walls of the compartment $g$ and the lower ends of which are seated on the bottom of such recesses. Co-operating with the front pair and the rear pair of pillars respectively are moving contact blades 9, 9a on the upper end of each of which are buttons 9¹ having contact faces on each side for engagement with buttons 8¹ provided on the lower opposed faces of the pillars each of which is bored for reception of cable and is obliquely tapped for receiving a terminal screw 10 accessible through slots in the cover $d^1$, as seen in Figure 1. When this cover is removed the operation of the contacts can be observed thereby facilitating inspection and testing. The terminal pillars 8 are trapped in position when the cover is secured.

The lower ends of these blades 9, 9a are formed with apertures through which freely extends a horizontal metal bar 11, to the front end of which is attached an actuating start push button 12 made of insulating material. This bar extends also through openings in the upstanding arms of a U-shaped metal cradle 13 which is slidable on the platform of the compartment $g$. The lower end of the rear moving contact blade 9a is disposed between one of these arms and a washer 15 secured to the bar 11. In the "off" position a helical compression spring 16 of extended length coiled around the bar is operative for pressing this washer against a fixed vertical plate 14 through which the bar extends freely and which is mounted in vertical grooves in the side walls of the compartment $g$ and held downwardly by one of the pillars 8. The lower end of the other moving contact 9 is engaged with the forward arm of the cradle 13 and the parts are maintained in this position by the spring 16 which has its forward end engaged with the contact 9 and with its other end abutting against the plate 14. In operating to the "on" position the button 12 is pressed inwards against the action of the spring 16 and the contact blades 9, 9ᵃ, are carried from the forwardly disposed pillars 8 of each pair into engagement with the rearward pillars, the buttons 9¹ thereon having a rolling action due to the movement of the blades from an inclination in one direction through the perpendicular to an inclination in the other directions. The arrangement enables a single spring not only to move the mechanism j to the "off" position but also to compensate for inequalities in the alignment and relative positioning of respective contacts due to variations in production of the parts or in assembly.

The bar 11 is formed with a depending arm 11ᵃ engageable by a lateral projection 17 on the armature support a. When the start button is pushed inwards, the contacts 9, 9ᵃ are moved from the full line position to dotted line position (Figure 3) so as to close the coil circuit of the magnet c and cause the armature b to be attracted. The projection 17 then maintains the armature in the "on" position when the start button is released. In the full line position of the contacts 9, 9ᵃ (Figure 3), that is in the "off" position, such contacts engage another set of terminal pillars which may be connected to the coil circuit of another contactor or motor starting switch. Consequently, the improved arrangement enables the making of one set of contacts and the breaking of another set by the operation of the push button 12, whereby the coil circuit of the motor starting switch is made and another circuit, for example, the coil of another such switch is broken at the same time.

Having thus described our invention, we claim:

1. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, a bracket within said box and secured to said bimetal member, a mounting within said box for rotationally supporting said bracket and bimetal member for movement about the longitudinal axis of said bimetal member, and means for effecting rotational adjustment of said bracket and bimetal member about said mounting to vary the relation between the said leg and said trip bar.

2. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, an L-shaped bracket within said box having one arm secured to said bimetal member, a mounting within said box and engaging the other arm of said L-shaped bracket for rotationally supporting said bracket and bimetal for movement about the longitudinal axis of said bimetal member, and means for effecting rotational adjustment of said L-shaped bracket and bimetal member about said mounting to vary the relation between said leg and said trip bar.

3. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, a bracket within said box and secured to said bimetal member, a locating boss on the inner surface of said box for rotationally supporting said bracket and bimetal member for movement about the longitudinal axis of said bimetal member, and means for effecting rotational adjustment of said bracket and bimetal member about said boss to vary the relation between said leg and said trip bar.

4. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, an L-shaped bracket within said box having one arm secured to said bimetal member, a locating boss on the inner surface of said box and engaging the other arm of said L-shaped bracket for rotationally supporting said bracket and bimetal member for movement about the longitudinal axis of said bimetal member, and means for effecting rotational adjustment of said L-shaped bracket and bimetal member about said boss to vary the relation between said leg and said trip bar.

5. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, an L-shaped bracket within said box having one arm secured to said bimetal, a mounting within said box and engaging the other arm of said L-shaped bracket for rotationally supporting said bracket and bimetal member for movement about the longitudinal axis of said bimetal member, means for effecting rotational adjustment of said L-shaped bracket and bimetal member about said mounting to vary the relation between said leg and said trip bar, and means engaging said box and said other arm for clamping said bracket and bimetal member in adjusted position about said mounting.

6. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, a bracket within said box and secured to said bimetal member, a locating boss on the inner surface of said box for rotationally supporting said bracket and bimetal member for movement about the longitudinal axis of said bimetal member, means for effecting rotational adjustment of said bracket and bimetal member about said boss to vary the relation between said leg and said trip bar, and a clamping screw engaging said box and said bracket to retain the bracket and bimetal in adjusted position about said locating boss.

7. An overload box for a polyphase motor starting switch including trip mechanism for actuating said switch from closed circuit position to open circuit position in the event of overload, said box having therein overload devices each including a part-cylindrical bimetal member having a leg portion extending outwardly from the longitudinal axis of said member, a trip bar for actuating the trip mechanism of said switch to move said switch to open circuit position in the event of overload, said trip bar being engageable by said leg and movable thereby, a bracket within said box and secured to said bimetal member, a locating boss on the inner surface of said box for rotationally supporting said bracket and bimetal member for movement about the longitudinal axis of said bimetal member, the wall of said box having an arcuate slot therethrough adjacent to and concentric with said locating boss, said bracket being rotationally mounted on said boss and having a tapped opening therein overlying said arcuate slot, and a headed clamping screw having its threaded shank passed through said slot and threadedly engaged with said tapped opening to retain the bracket and bimetal member in adjusted position about said locating boss, the position of adjustment of said bracket and bimetal member about said locating boss determining the relation between said leg and said trip bar.

References Cited in the file of this patent

UNITED STATES PATENTS

| Number | Name | Date |
|---|---|---|
| 1,914,529 | Rich | June 20, 1933 |
| 2,438,186 | Randall | Mar. 23, 1948 |
| 2,487,637 | Cole et al. | Nov. 8, 1949 |